United States Patent
Scown et al.

(10) Patent No.: US 9,308,997 B2
(45) Date of Patent: Apr. 12, 2016

(54) LAVATORY RECONFIGURATION SYSTEM

(71) Applicants: Stephen Lee Scown, Edmonds, WA (US); Paul Joseph Wilcynski, Seattle, WA (US); Jeffrey Nix, Stanwood, WA (US); Marc Anton Spane, Camano Island, WA (US)

(72) Inventors: Stephen Lee Scown, Edmonds, WA (US); Paul Joseph Wilcynski, Seattle, WA (US); Jeffrey Nix, Stanwood, WA (US); Marc Anton Spane, Camano Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 326 days.

(21) Appl. No.: 13/621,462

(22) Filed: Sep. 17, 2012

(65) Prior Publication Data
US 2014/0077033 A1    Mar. 20, 2014

(51) Int. Cl.
*B64D 13/00*     (2006.01)
*B64D 11/02*     (2006.01)
*B64D 11/00*     (2006.01)

(52) U.S. Cl.
CPC ............ *B64D 11/02* (2013.01); *B64D 11/0023* (2013.01)

(58) Field of Classification Search
CPC ... B64D 11/0003; B64D 11/02; E04B 1/3445
USPC .......................................... 244/118.5; 50/70
See application file for complete search history.

(56) References Cited

U.S. PATENT DOCUMENTS

| | | | |
|---|---|---|---|
| 3,541,750 A | | 11/1970 | Ritter |
| 3,862,525 A | | 1/1975 | Greenspan |
| 4,100,857 A | * | 7/1978 | Gutridge et al. ............... 105/323 |
| 4,589,463 A | | 5/1986 | Ryan |
| 4,672,772 A | | 6/1987 | Nakamura |
| 5,573,053 A | | 11/1996 | Hanemaayer |
| 6,007,025 A | * | 12/1999 | Coughren et al. ......... 244/118.6 |
| 6,079,669 A | * | 6/2000 | Hanay et al. ............... 244/118.5 |
| 6,186,444 B1 | | 2/2001 | Steel |
| 6,257,523 B1 | | 7/2001 | Olliges |
| 6,604,709 B1 | * | 8/2003 | Wentland et al. .......... 244/118.5 |
| 6,615,421 B2 | * | 9/2003 | Itakura ............................... 4/664 |
| 6,889,936 B1 | | 5/2005 | Pho et al. |
| 7,152,257 B2 | | 12/2006 | Stratmann et al. |

(Continued)

FOREIGN PATENT DOCUMENTS

DE    102011011704 A1    12/2012
WO    WO03064790 A1    8/2003

(Continued)

OTHER PUBLICATIONS

McIntosh, "Modular Lavatory System," U.S. Appl. No. 14/045,493, filed Oct. 3, 2013, 56 pages.

(Continued)

*Primary Examiner* — Brian M O'Hara
*Assistant Examiner* — Keith L Dixon
(74) *Attorney, Agent, or Firm* — Yee & Associates, P.C.

(57) ABSTRACT

A method and apparatus operating a moveable partition. The moveable partition is configured for use with a first lavatory and a second lavatory. The moveable partition is further configured to separate the first lavatory and the second lavatory into separate spaces within a fixed perimeter for the first lavatory and the second lavatory when the moveable partition is in a first configuration. The moveable partition is further configured to define a single space within the fixed perimeter when the moveable partition is in a second configuration. The moveable partition is connected to a door for the first lavatory in the second configuration.

15 Claims, 16 Drawing Sheets

(56) References Cited

U.S. PATENT DOCUMENTS

| | | |
|---|---|---|
| 7,165,595 B2 | 1/2007 | Yamamoto |
| 7,222,820 B2 | 5/2007 | Wentland et al. |
| 7,364,119 B2 * | 4/2008 | Sprenger et al. ........... 244/118.6 |
| 7,721,990 B2 | 5/2010 | Jaeger et al. |
| 7,823,834 B2 | 11/2010 | French et al. |
| 7,866,603 B2 | 1/2011 | Cooper et al. |
| 7,950,439 B2 | 5/2011 | Anderson |
| 7,984,875 B2 | 7/2011 | Koehn et al. |
| 8,517,307 B2 | 8/2013 | Saint-Jalmes et al. |
| 8,621,787 B2 | 1/2014 | Barry et al. |
| 8,672,267 B2 | 3/2014 | Schliwa et al. |
| 8,720,827 B2 | 5/2014 | Boren |
| 2003/0066931 A1 | 4/2003 | Ward |
| 2004/0173327 A1 | 9/2004 | Steel et al. |
| 2004/0227034 A1 | 11/2004 | Wentland et al. |
| 2005/0116098 A1 | 6/2005 | Martens et al. |
| 2005/0116099 A1 | 6/2005 | Pho et al. |
| 2005/0241062 A1 | 11/2005 | Quan |
| 2006/0169839 A1 | 8/2006 | French et al. |
| 2007/0119548 A1 | 5/2007 | Anderson |
| 2009/0065641 A1 | 3/2009 | Koehn et al. |
| 2010/0237193 A1 | 9/2010 | Yoshizaki |
| 2012/0261509 A1 | 10/2012 | Grant et al. |
| 2013/0206907 A1 | 8/2013 | Burrows et al. |
| 2014/0083012 A1 | 3/2014 | Boren et al. |

FOREIGN PATENT DOCUMENTS

| | | |
|---|---|---|
| WO | WO2004076279 A2 | 9/2004 |
| WO | WO2011101385 A2 | 8/2011 |

OTHER PUBLICATIONS

"Lavatory Accessibility in Single-Aisle Aircraft, Final Report of the Aircraft Accessibility Federal Advisory Committee," Office of Environment, Energy, and Safety, U.S. Department of Transportation, Apr. 1993, 61 pages, accessed Aug. 30, 2012 ntl.bts.gov/lib/22000/22900/22931/lavacces.pdf.

"Space-Flex: Innovative cabin option for A320; Cabin configuration adds space for more seats," Noticias Airbus, No. 142, Apr./May 2012, 1 page, accessed Aug. 30, 2012 http://www.noticiaslatamsales.com/en/editions/detail/AprMay2012/innovations/129/Space-Flex-Innovative-cabin-option-for-A320.

Notice of Allowance, dated Mar. 3, 2014, regarding U.S. Appl. No. 13/625,872, 10 pages.

Office Action, dated Apr. 23, 2014, regarding U.S. Appl. No. 13/915,031, 20 pages.

Notice of Allowance, dated Sep. 3, 2014, regarding U.S. Appl. No. 13/915,031, 13 pages.

International Search Report and Written Opinion dated Sep. 19, 2014, regarding Application No. PCT/US2014/043682, 11 pages.

Extended European Search Report, dated Nov. 21, 2014, regarding Application No. EP14162310.8, 7 pages.

Boren, "Dual Function Lavatory Door," U.S. Appl. No. 13/625,872, filed Sep. 25, 2012, 38 pages.

McIntosh, "Lavatory Reconfiguration System," U.S. Appl. No. 13/915,031, filed Jun. 11, 2013, 57 pages.

* cited by examiner

LAVATORY RECONFIGURATION SYSTEM

BACKGROUND INFORMATION

1. Field

The present disclosure relates generally to aircraft and, in particular, to lavatories in aircraft. Still more particularly, the present disclosure relates to providing a desired level of access to lavatories in an aircraft.

2. Background

In designing and manufacturing aircraft, maximizing the amount of space available for passenger seating is an important consideration. In addition to passenger seating, galleys, closets, lavatories, and other areas may take up space in the interior of the aircraft.

With respect to the design of lavatories, handicap access is important. Handicap access includes access for passengers in wheelchairs. Standards for handicap access in an aircraft are often specified through regulations and laws.

In some cases, the lavatories designed for accommodating handicapped passengers require more space than standard lavatories in an aircraft. A lavatory may be redesigned to provide the desired amount of space for access by handicapped passengers.

The redesign may be performed for an aircraft being manufactured or the redesign may be used to refurbish existing aircraft to provide the desired access for handicapped passengers. This redesign may take various forms. For example, the perimeter of the lavatory may be redesigned such that a desired amount of space is present with a desired configuration within the lavatory.

In some cases, the lavatories may be redesigned to extend into space normally used for aisles or other purposes when access by a handicapped passenger is needed. In yet other examples, a more efficient use of space may involve two lavatories being positioned next to each other and reconfigured to provide more access as a single lavatory for a handicapped passenger when needed.

These and other systems have been used to provide additional access for handicapped passengers but may not provide as efficient of a design as desired in an aircraft. For example, lavatories that use additional space in the cabin may be more difficult to reconfigure than desired. These systems also may limit desired access in other areas when a lavatory is reconfigured to use additional space in the cabin.

Also, lavatories that are convertible from two lavatories into a single lavatory also may be more difficult to reconfigure and may not be as efficient as desired. Therefore, it would be desirable to have a method and apparatus that takes into account at least some of the issues discussed above, as well as other possible issues.

SUMMARY

In one illustrative embodiment, an apparatus comprises a moveable partition. The moveable partition is configured for use with a first lavatory and a second lavatory. The moveable partition is further configured to separate the first lavatory and the second lavatory into separate spaces within a fixed perimeter for the first lavatory and the second lavatory when the moveable partition is in a first configuration. The moveable partition is further configured to define a single space within the fixed perimeter when the moveable partition is in a second configuration. The moveable partition is connected to a door for the first lavatory in the second configuration.

In another illustrative embodiment, a method for reconfiguring lavatory space in an aircraft is present. A moveable partition for a first lavatory and a second lavatory is moved between a first configuration and a second configuration. The first configuration separates the first lavatory and the second lavatory into separate spaces within a fixed perimeter for the first lavatory and the second lavatory. The second configuration has a single space present within the fixed perimeter. The moveable partition is connected to a door for the first lavatory in the second configuration.

In yet another illustrative embodiment, a method of operating an aircraft is present. The aircraft is operated in which a first lavatory and a second lavatory are located in the aircraft with a moveable partition configured for use with the first lavatory and the second lavatory. The moveable partition is configured to separate the first lavatory and the second lavatory into separate spaces within a fixed perimeter for the first lavatory and the second lavatory when the moveable partition is in a first configuration. The moveable partition is further configured to define a single space within the fixed perimeter when the moveable partition is in a second configuration. The moveable partition is connected to a door for the first lavatory in the second configuration.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to maintain the same perimeter for a lavatory rather than encroaching on space in the cabin through changing the perimeter of the lavatory.

The illustrative embodiments also recognize and take into account that existing systems that convert two lavatories into a single larger lavatory for use by passengers who may require more space may be more difficult to reconfigure than desired. Further, these designs also may be less efficient than desired. For example, the illustrative embodiments recognize and take into account that a wall dividing two lavatories may be folded back against an interior wall of the two lavatories to provide additional space for a handicapped passenger. The reconfiguration of a folding wall against an interior wall of the two lavatories may provide this additional space for a handicapped passenger or other passengers needing more space in a lavatory.

However, the illustrative embodiments recognize and take into account that this type of reconfiguration may reduce or block access to different components in the combined lavatories. For example, the reconfiguration of the folding wall may block access to one or both of the two toilets and also may block access to a sink in the lavatories. As a result, maneuvering within the lavatories may be more difficult than desired.

Thus, the illustrative embodiments provide a method and apparatus for reconfiguring a lavatory space in an aircraft. In one illustrative embodiment, an apparatus comprises a moveable partition. The moveable partition is configured for use with a first lavatory and a second lavatory. The moveable partition is configured to separate the first lavatory and the second lavatory into separate spaces with a fixed perimeter for the first lavatory and the second lavatory when the moveable partition is in a first configuration. When the moveable partition is in a second configuration, the moveable partition is configured to define a single space within the fixed perimeter. The moveable partition is connected to a door for the first lavatory in the second configuration.

Figure 1:
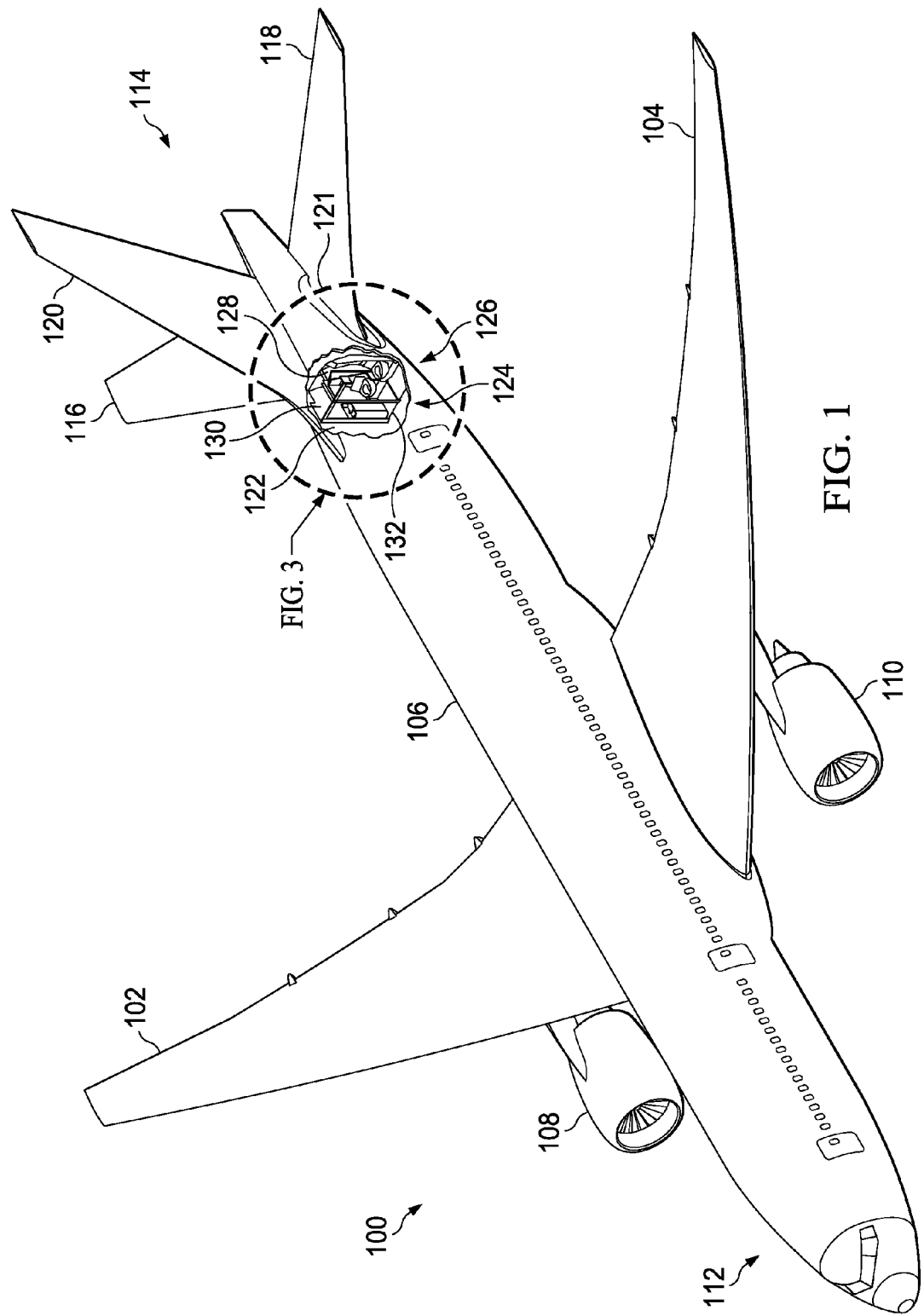
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has nose section 112 and tail section 114. Horizontal stabilizer 116, horizontal stabilizer 118, and vertical stabilizer 120 are attached to tail section 114 of fuselage 106.

Aircraft 100 is an example of an aircraft in which a lavatory access system may be implemented in accordance with an illustrative embodiment. As depicted, section 121 illustrates an exposed view in which interior 122 of passenger cabin 124 in fuselage 106 of aircraft 100 is seen. In this illustrative example, section 121 of passenger cabin 124 includes lavatory area 126 as seen in this exposed view.

In this illustrative example, lavatory area 126 includes first lavatory 128 and second lavatory 130. These lavatories are examples of lavatories that may be reconfigured to allow greater access to handicapped passengers in accordance with an illustrative embodiment. In particular, these lavatories may be reconfigured without changing perimeter 132 for first lavatory 128 and second lavatory 130. In other words, perimeter 132 remains fixed in these illustrative examples.

Figure 2:
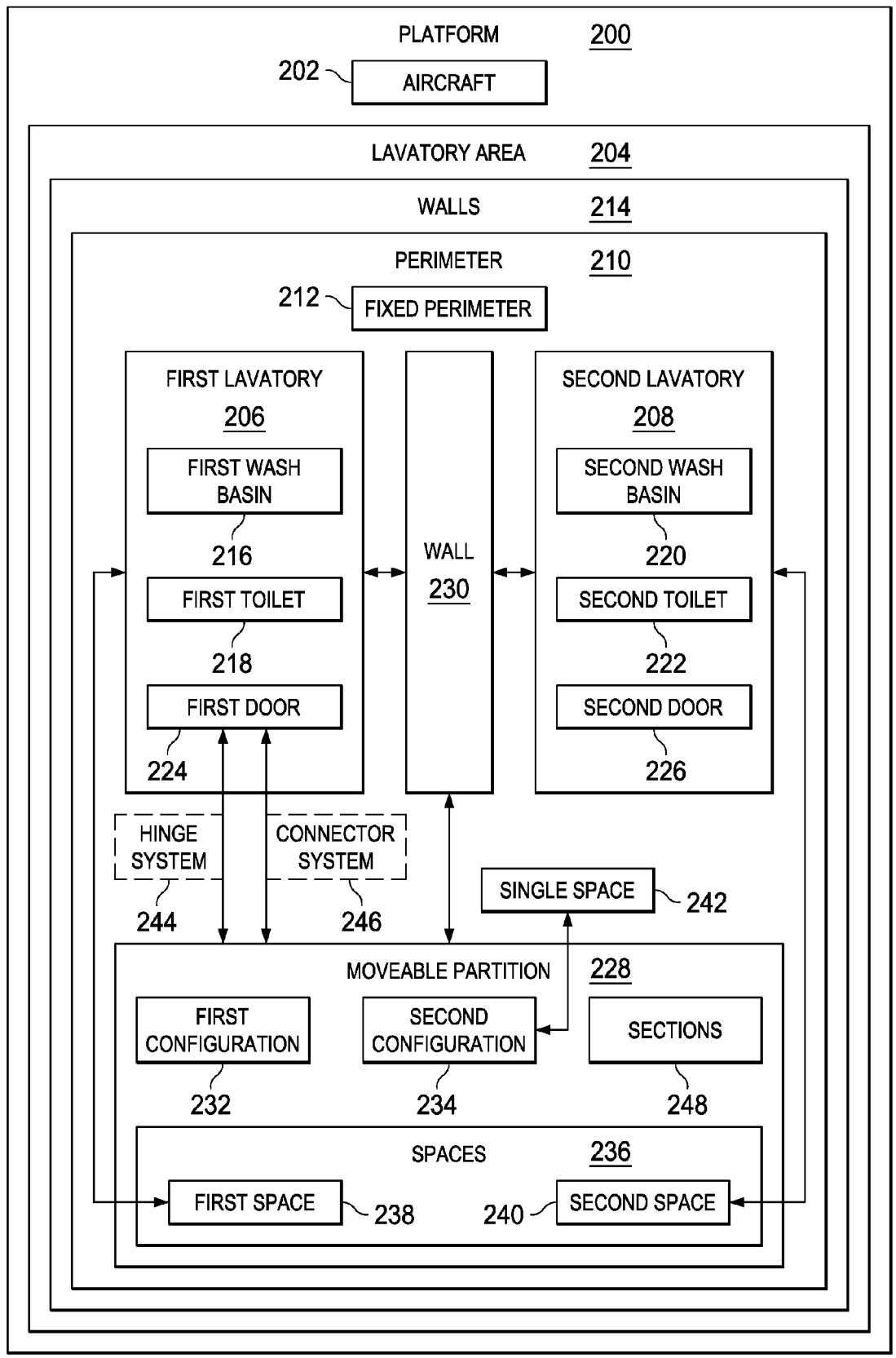
FIG. 2 is an illustration of a block diagram of a platform with a lavatory area in accordance with an illustrative embodiment.

With reference now to FIG. 2, an illustration of a block diagram of a platform with a lavatory area is depicted in accordance with an illustrative embodiment. In this depicted example, platform 200 may be aircraft 202. Aircraft 100 in FIG. 1 is an example of one physical implementation for aircraft 202 shown in block form in this figure.

As depicted, platform 200 includes lavatory area 204. Lavatory area 204 is an area within platform 200 in which first lavatory 206 and second lavatory 208 may be located. In this illustrative example, first lavatory 206 and second lavatory 208 are adjacent to each other.

Perimeter 210 is a boundary around first lavatory 206 and second lavatory 208. In this illustrative example, perimeter 210 takes the form of fixed perimeter 212 that extends around first lavatory 206 and second lavatory 208. As depicted, perimeter 210 is fixed perimeter 212 because walls 214 forming perimeter 210 around first lavatory 206 and second lavatory 208 are fixed and do not move into other areas within lavatory area 204 or other areas within platform 200.

In this illustrative example, first lavatory 206 includes first wash basin 216 and first toilet 218. Second lavatory 208 includes second wash basin 220 and second toilet 222. Additionally, first lavatory 206 has first door 224 and second lavatory 208 has second door 226 located within walls 214.

As depicted, moveable partition 228 is present in lavatory area 204 and forms at least part of wall 230 between first lavatory 206 and second lavatory 208. Moveable partition 228 is a structure that may be used to reconfigure space for first lavatory 206 and second lavatory 208 within walls 214.

Moveable partition 228 may be comprised of different types of materials. For example, moveable partition 228 may be comprised of a composite material, a metal, or some other suitable type of material.

Moveable partition 228 may have first configuration 232 and second configuration 234. In particular, moveable partition 228 may be moved between first configuration 232 and second configuration 234.

In these illustrative examples, when moveable partition 228 is in first configuration 232, moveable partition 228 forms at least a portion of wall 230. In first configuration 232, moveable partition 228 is configured to separate first lavatory 206 and second lavatory 208 into spaces 236. In particular, spaces 236 include first space 238 and second space 240. First space 238 is space within first lavatory 206 in perimeter 210. Second space 240 is space within second lavatory 208 in perimeter 210.

When moveable partition 228 is in second configuration 234, moveable partition 228 defines single space 242 for first lavatory 206 and second lavatory 208 instead of spaces 236. Single space 242 may provide additional room for passengers such as a family, a handicapped passenger, or other types of passengers who may require additional room within lavatory area 204.

In these illustrative examples, moveable partition 228 may be connected to first door 224 for first lavatory 206 when moveable partition 228 is in second configuration 234. As used herein, a first component, moveable partition 228, "connected to" a second component, first door 224, means that the first component can be connected directly or indirectly to the second component. In other words, additional components may be present between the first component and the second component. The first component is considered to be indirectly connected to the second component when one or more additional components are present between the two components.

When the first component is directly connected to the second component, no additional components are present between the two components.

In this illustrative example, moveable partition 228 may be connected to first door 224 by connector system 246. In particular, connector system 246 may be, for example, a latch. Further, the latch may be a magnetic latch.

Hinge system 244 is associated with first door 224 and moveable partition 228. Hinge system 244 is configured to allow moveable partition 228 to rotate into a position against first door 224. Hinge system 244 also may allow moveable partition 228 to fold when moveable partition 228 is comprised of sections 248. In this particular example, moveable partition 228 is configured to be folded against first door 224 when moveable partition 228 is in second configuration 234.

The illustration of platform 200 and lavatory area 204 in platform 200 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 200 has been described as being implemented as aircraft 202, platform 200 may be implemented in other forms. Platform 200 may be, for example, a mobile platform, a stationary platform, a land-based structure, an aquatic-based structure, and a space-based structure. More specifically, platform 200 may be a surface ship, a train, a spacecraft, a space station, a submarine, a power plant, a house, an office, a manufacturing facility, a building, and other suitable platforms.

In another illustrative example, a third lavatory may be adjacent to one of first lavatory 206 and second lavatory 208. The common wall between the third lavatory and the other lavatory may also be formed using another moveable partition similar to moveable partition 228. In other illustrative examples, both common walls of the middle lavatory may be moveable partitions such that an even larger space is available if desired.

Figure 3:
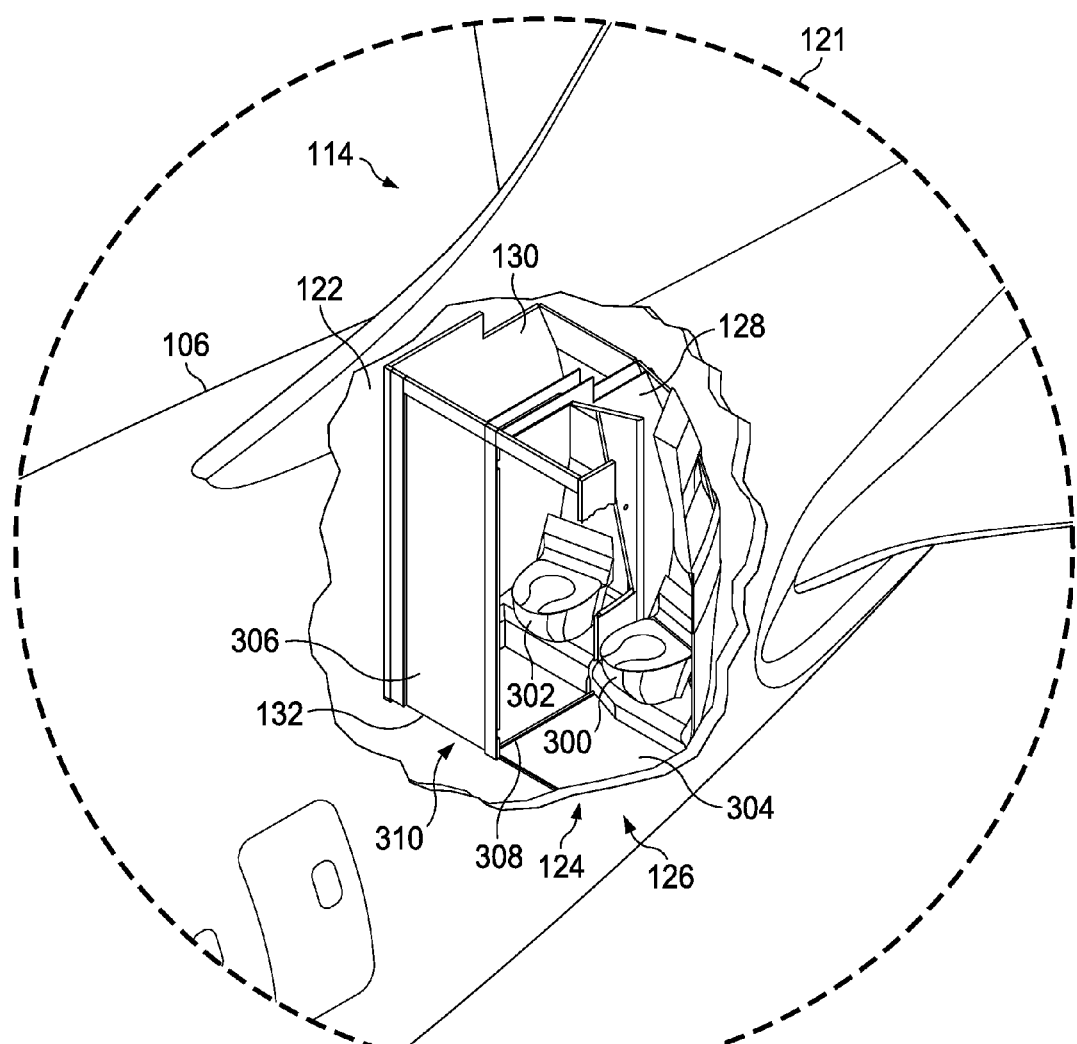
FIG. 3 is an illustration of a lavatory area in an aircraft in accordance with an illustrative embodiment.

With reference now to FIG. 3, an illustration of a lavatory area in an aircraft is depicted in accordance with an illustrative embodiment. In this depicted example, a more detailed illustration of section 121 in fuselage 106 of aircraft 100 is shown. Some components for first lavatory 128 and second lavatory 130 can be seen in this exposed view of lavatory area 126. In particular, first lavatory 128 and second lavatory 130 are examples of physical implementations for first lavatory 206 and second lavatory 208 in FIG. 2.

As depicted, first lavatory 128 includes first toilet 300 and second lavatory 130 includes second toilet 302. As can be seen in this illustrative example, first space 304 and second space 306 are located within perimeter 132. First space 304 and second space 306 are defined by perimeter 132 and guide 308.

In these illustrative examples, instead of placing a wall along guide 308, a moveable partition (not shown), such as moveable partition 228 shown in block form in FIG. 2 may be placed along guide 308. With the use of an illustrative embodiment, first space 304 and second space 306 within perimeter 132 may be combined to form single space 310.

Figure 4:
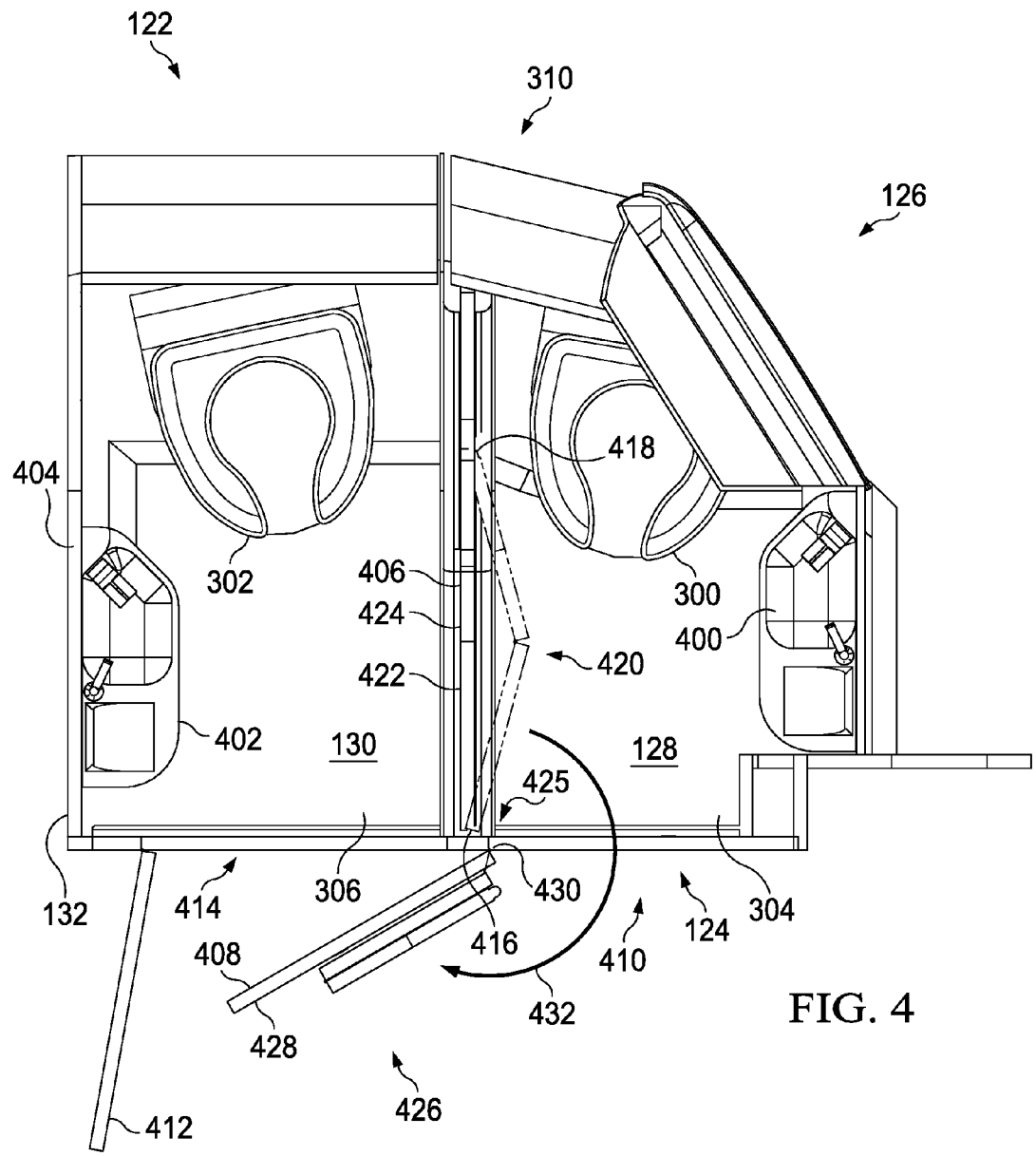
FIG. 4 is an illustration of a plan view of a first lavatory and a second lavatory within a lavatory area in accordance with an illustrative embodiment.

With reference now to FIG. 4, an illustration of a plan view of a first lavatory and a second lavatory within a lavatory area is depicted in accordance with an illustrative embodiment. A plan view of first lavatory 128 and second lavatory 130 is shown in this figure.

In this view, first wash basin 400 is shown in first lavatory 128. Additionally, second wash basin 402 is shown in second lavatory 130.

As can be seen in this plan view, walls 404 define perimeter 132. Perimeter 132 defines first space 304 and second space 306 for first lavatory 128 and second lavatory 130. In this illustrative example, first space 304 and second space 306 may be defined within perimeter 132 by moveable partition 406.

As depicted, first door 408 is a first door for first lavatory 128. First door 408 is located in first opening 410 in walls 404. Second door 412 is a door for second lavatory 130. Second door 412 is located in second opening 414 in walls 404.

As depicted, moveable partition 406 has first end 416 and second end 418. In this illustrative example, moveable partition 406 is comprised of first section 422 and second section 424. First end 416 of moveable partition 406 is connected to first door 408 by hinge system 425 in these illustrative examples.

As depicted, moveable partition 406 has first configuration 420 when moveable partition 406 defines first space 304 for first lavatory 128 and second space 306 for second lavatory 130 within perimeter 132.

Moveable partition 406 may be placed into second configuration 426. Moveable partition 406 is shown in phantom in second configuration 426. In second configuration 426, moveable partition 406 may be folded against side 428 of first door 408. Both first door 408 and moveable partition 406 may be rotated about common axis 430 in the direction of arrow 432.

When moveable partition 406 is in second configuration 426, first lavatory 128 and second lavatory 130 are no longer divided into first space 304 and second space 306. Instead, first space 304 and second space 306 are combined to form single space 310.

FIGS. 5-10 are illustrations of a reconfiguration of space for first lavatory 128 and second lavatory 130 using moveable partition 406 in accordance with an illustrative embodiment. These figures illustrate different configurations for moveable partition 406 used to divide and combine space within first lavatory 128 and second lavatory 130.

Figure 5:
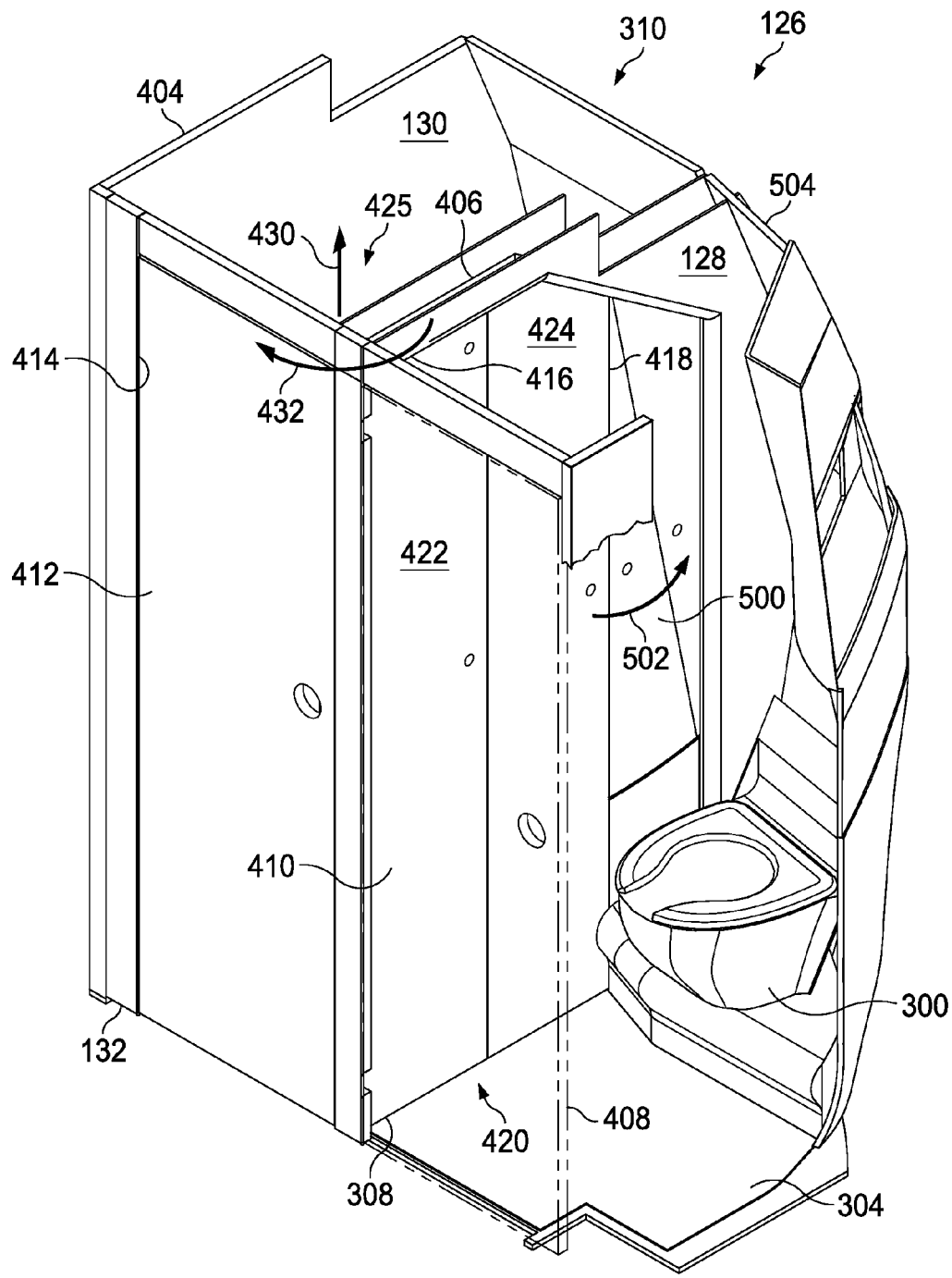
FIGS. 5-10 are illustrations of a reconfiguration of space for a first lavatory and a second lavatory using a moveable partition in accordance with an illustrative embodiment.

Turning now to FIG. 5, an illustration of an isometric view of a first lavatory and a second lavatory in a lavatory area is depicted in accordance with an illustrative embodiment. In this depicted example, an isometric view of lavatory area 126 with first lavatory 128 and second lavatory 130 is shown.

In this view, first door 408 is shown in phantom to provide a better view of first space 304 in first lavatory 128. Further, moveable partition 406 is shown in first configuration 420. As can be seen, moveable partition 406 defines first space 304 and second space 306. In this configuration, first lavatory 128 and second lavatory 130 may be used by different passengers. This configuration of space for first lavatory 128 and second lavatory 130 may be considered a normal configuration of space for these two lavatories.

Further, in this view, divider 500 is present. Divider 500 is located adjacent to at least one of first toilet 300 and second toilet 302. In this illustrative example, divider 500 is located between first toilet 300 and second toilet 302. Divider 500 is configured to move. In particular, divider 500 is rotatable and may be configured to rotate in the direction of arrow 502 toward wall 504. In this example, wall 504 is a fuselage wall.

Figure 6:
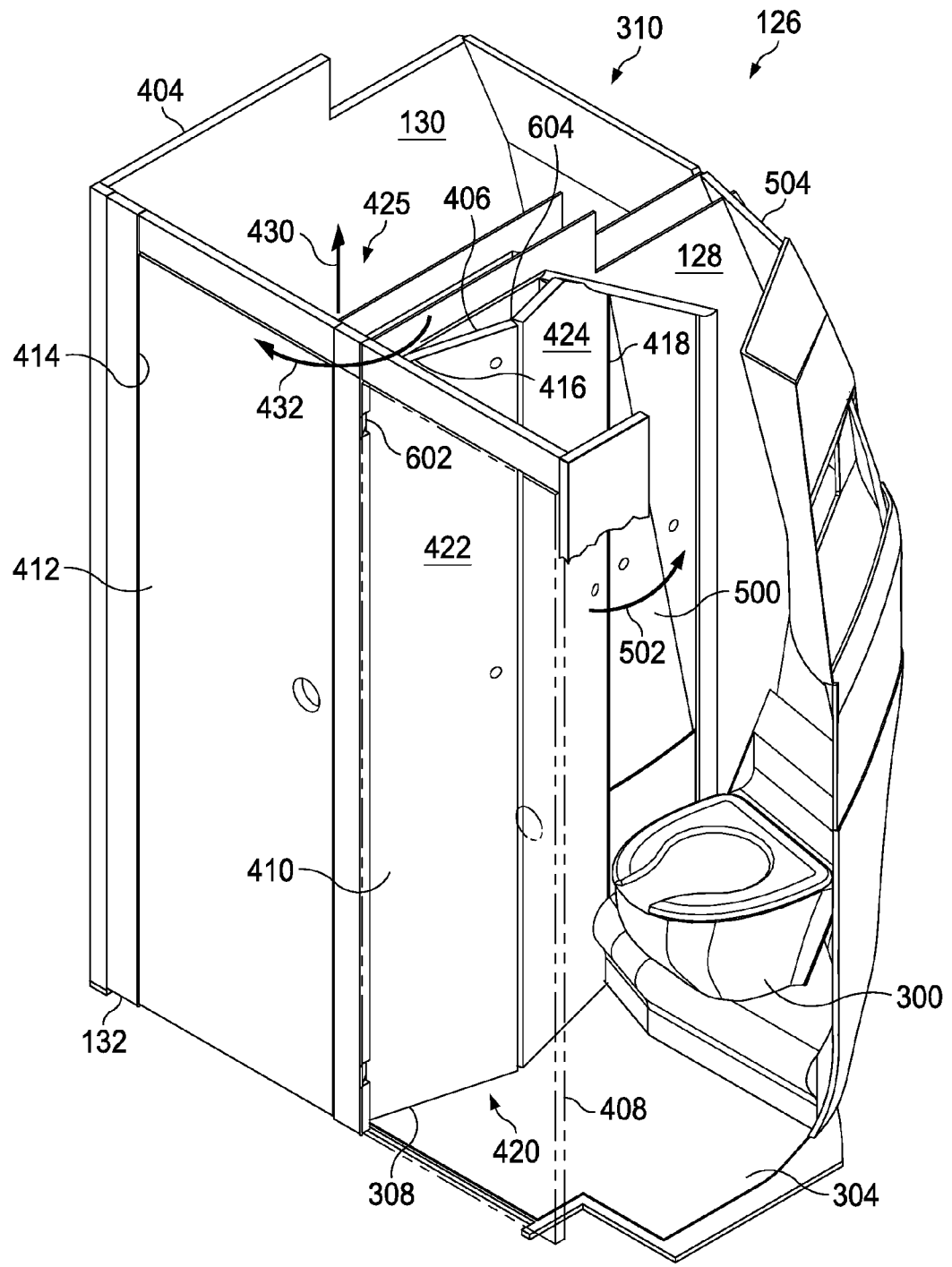

Turning now to FIG. 6, an illustration of movement of a moveable partition is depicted in accordance with an illustrative embodiment. In this illustration, moveable partition 406 begins moving out of first configuration 420.

As can be seen, moveable partition 406 begins rotating in the direction of arrow 432 about common axis 430. Hinge 602 in hinge system 425 provides for this movement. Additionally, first section 422 and second section 424 fold relative to each other through hinge 604 in hinge system 425.

Figure 7:
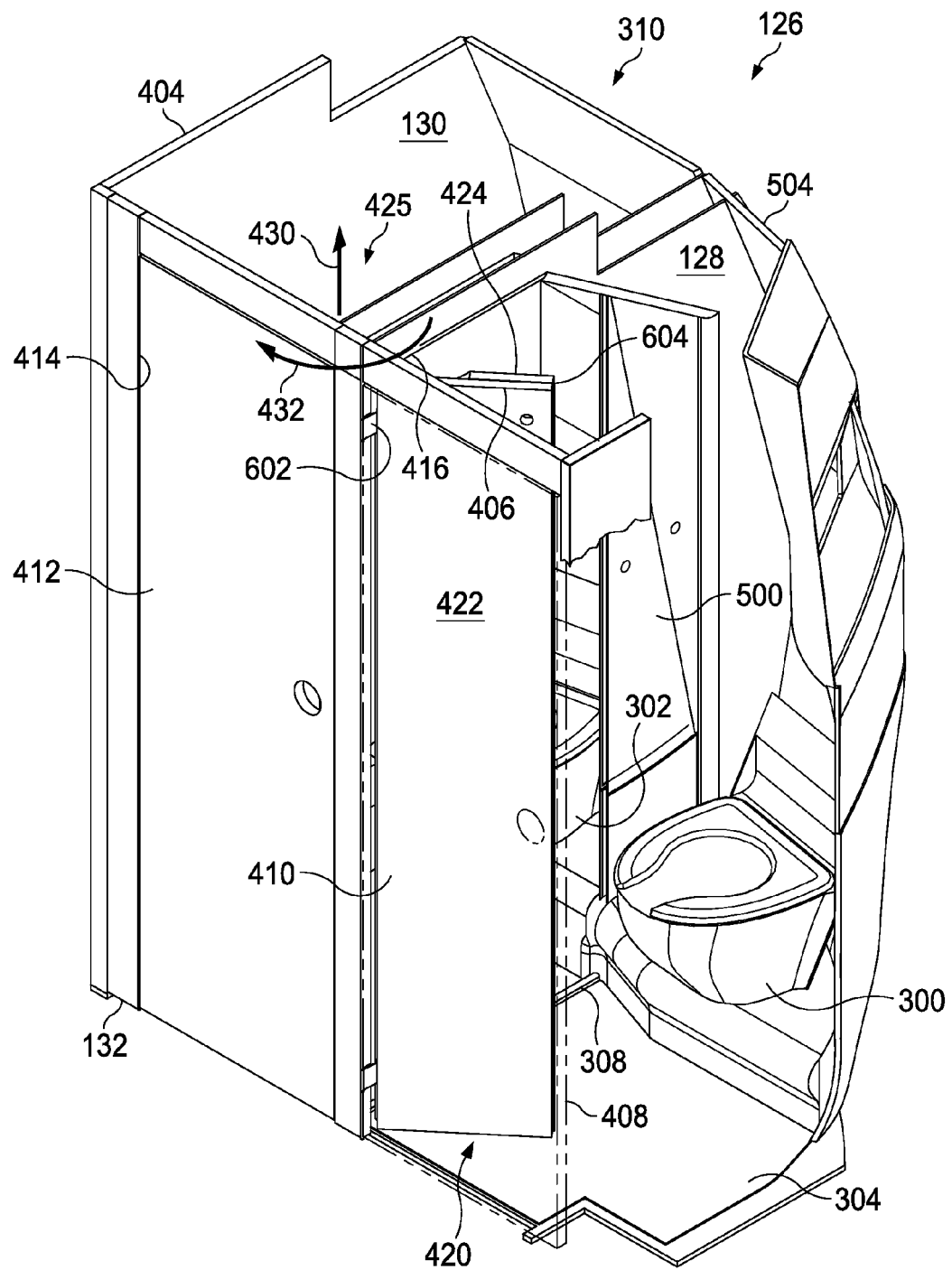

In FIG. 7, an illustration of movement of a moveable partition is depicted in accordance with an illustrative embodiment. In this figure, first section 422 and section 424 of moveable partition 406 are folded against each other. Additionally, moveable partition 406 is shown as having rotated further about common axis 430 in the direction of arrow 432.

Figure 8:
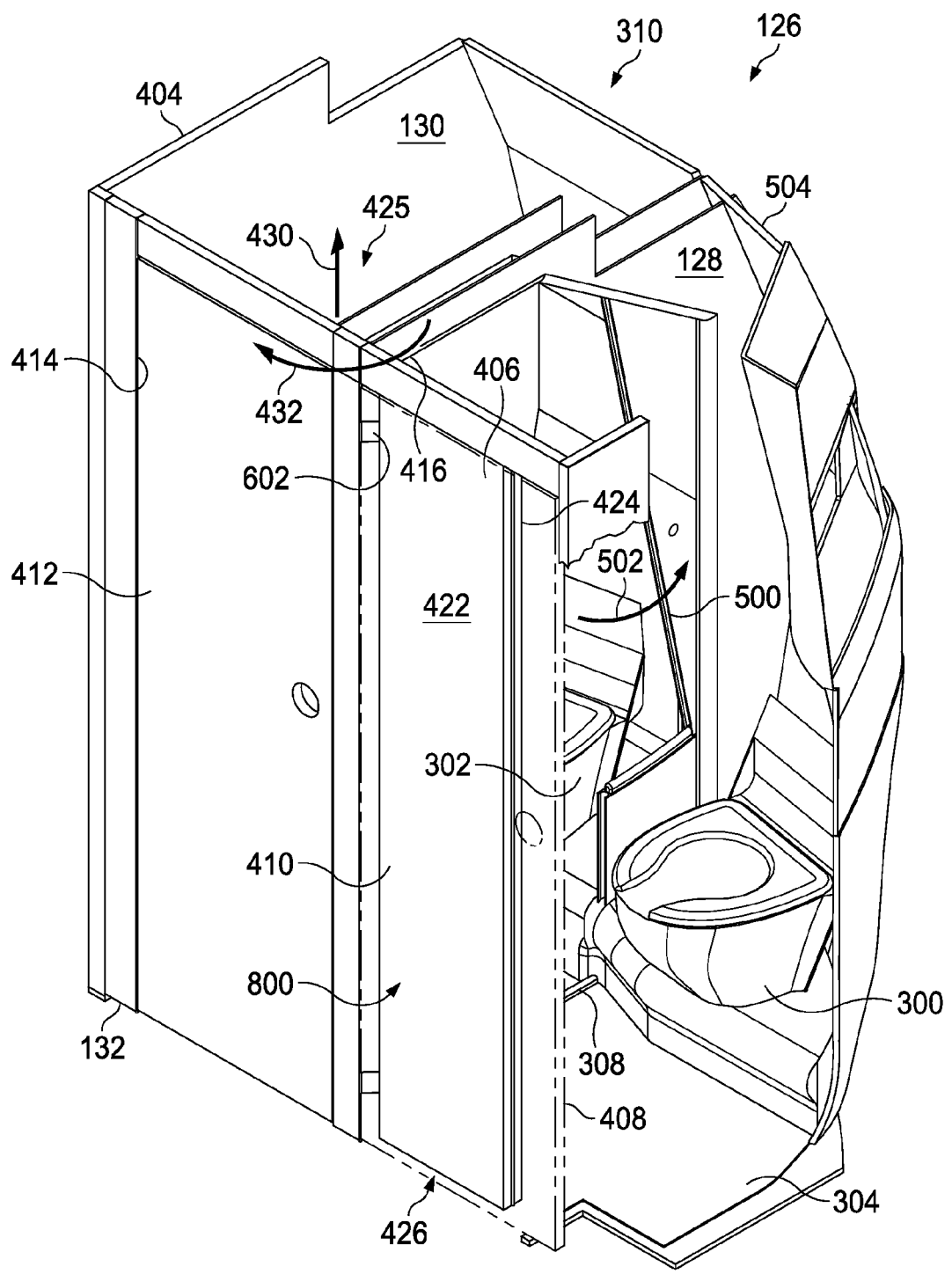

Next, FIG. 8 is an illustration of movement of a moveable partition in accordance with an illustrative embodiment. In this illustration, moveable partition 406 is in folded position 800 against first door 408. When moveable partition 406 is in folded position 800 against first door 408, moveable partition 406 is connected to first door 408. This connection may be made through a connector system (not shown). Additionally, divider 500 has been rotated toward wall 504 in the direction of arrow 502.

In this illustrative example, moveable partition 406 is in second configuration 426 against first door 408. Of course, moveable partition 406 may be considered to be in second configuration 426 whenever moveable partition 406 has been moved such that both first space 304 and second space 306 may be used as single space 310.

Figure 9:
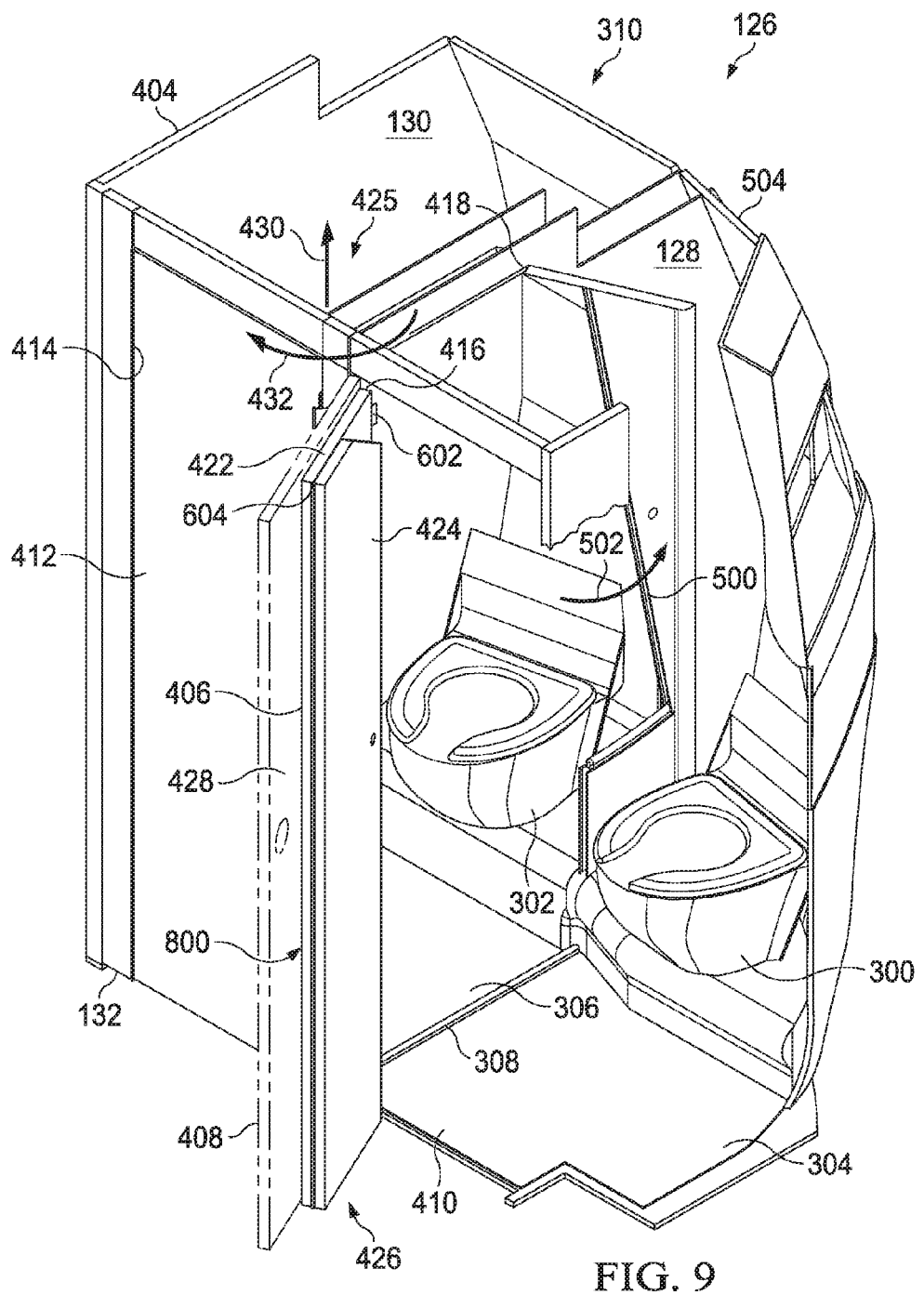

Turning now to FIG. 9, an illustration of movement of a moveable partition is depicted in accordance with an illustrative embodiment. In this view, first door 408 is shown rotated in the direction of arrow 432 about common axis 430. Additionally, moveable partition 406 also rotates with first door 408 in the direction of arrow 432 about common axis 430.

Figure 10:
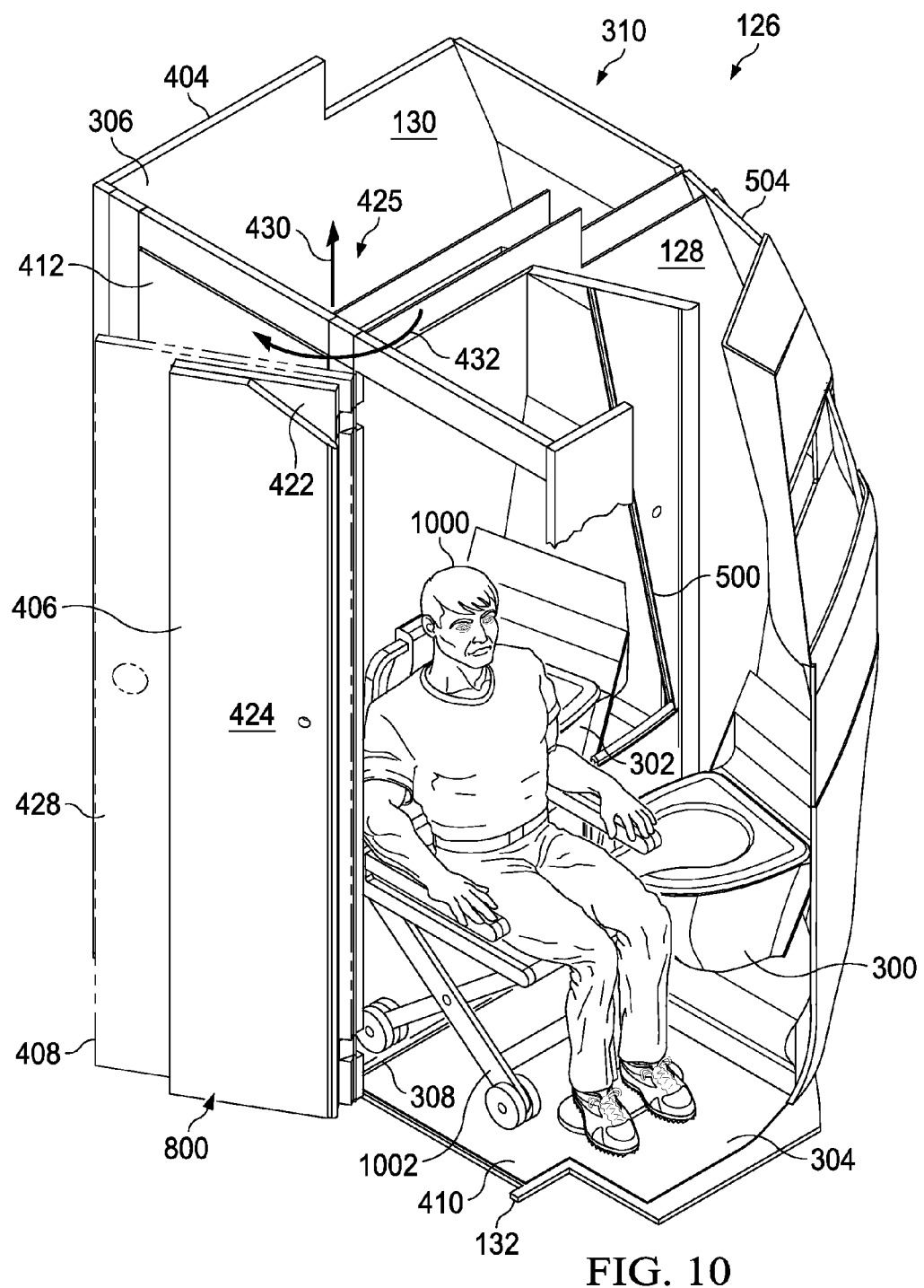

Turning now to FIG. 10, an illustration of a first lavatory and a second lavatory in a lavatory area reconfigured for use with a single space is depicted in accordance with an illustrative embodiment. In this illustrative example, first lavatory 128 and second lavatory 130 are configured to provide single space 310 within perimeter 132 for passenger 1000 located in wheelchair 1002.

As can be seen in this example, moveable partition 406 is in folded position 800 against side 428 of first door 408. Additionally, divider 500 has been rotated towards wall 504 in walls 404 to provide increased access to at least one of first toilet 300 in first lavatory 128 and second toilet 302 in second lavatory 130 as well as possibly other components for these two lavatories.

The illustration of first lavatory 128 and second lavatory 130 with moveable partition 406 in FIG. 1 and FIGS. 3-10 is not meant to imply limitations to the manner in which other lavatories may be implemented with moveable partitions. For example, a moveable partition may have one or more additional sections in addition to first section 422 and second section 424 in other illustrative examples.

Figure 11:
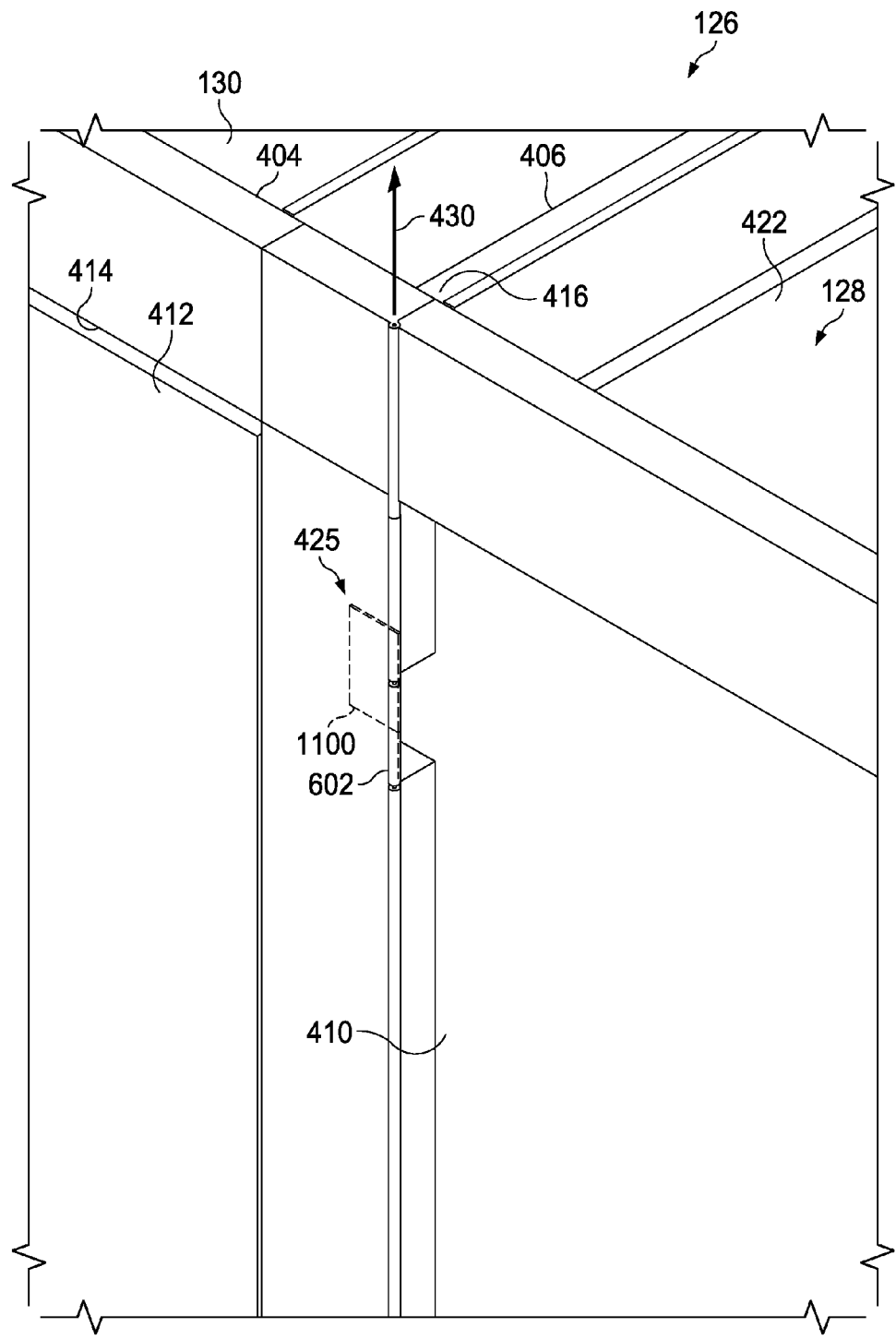
FIG. 11 is an illustration of a more detailed view of a hinge connection for a moveable partition in accordance with an illustrative embodiment.

With reference now to FIG. 11, an illustration of a more detailed view of a hinge connection for a moveable partition is depicted in accordance with an illustrative embodiment. In this illustrative example, a more detailed illustration of hinge 602 is shown. As can be seen, section 1100 of hinge 602 is connected to first end 416 of first section 422 in moveable partition 406.

Figure 12:
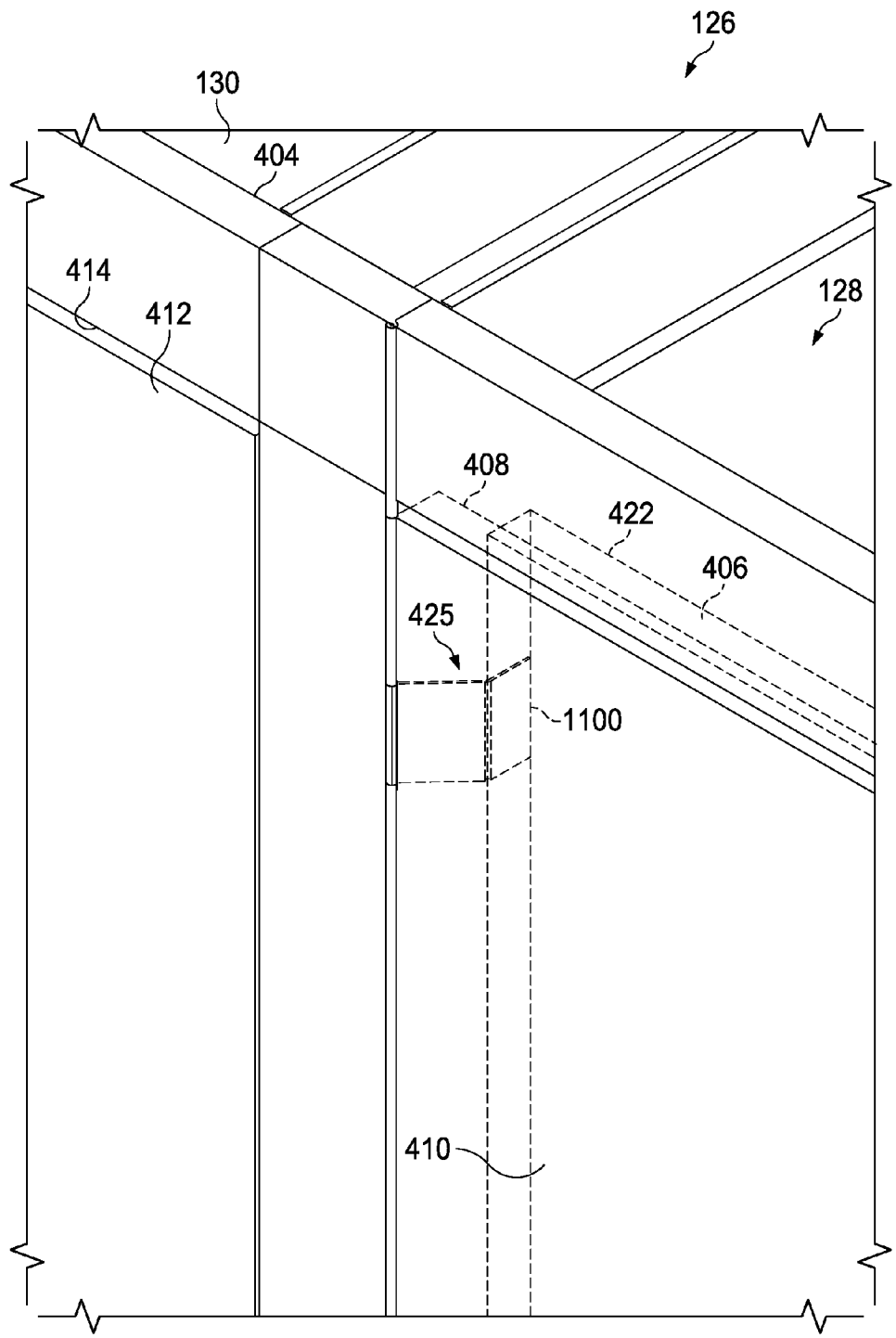
FIG. 12 is an illustration of movement for a hinge connection for a moveable partition in accordance with an illustrative embodiment.

Turning now to FIG. 12, an illustration of movement for a hinge connection for a moveable partition is depicted in accordance with an illustrative embodiment. In this view, moveable partition 406 has been rotated against first door 408. As can be seen, section 1100 is configured to allow moveable partition 406 to move against first door 408 such that moveable partition 406 and first door 408 are substantially parallel to each other.

Figure 13:
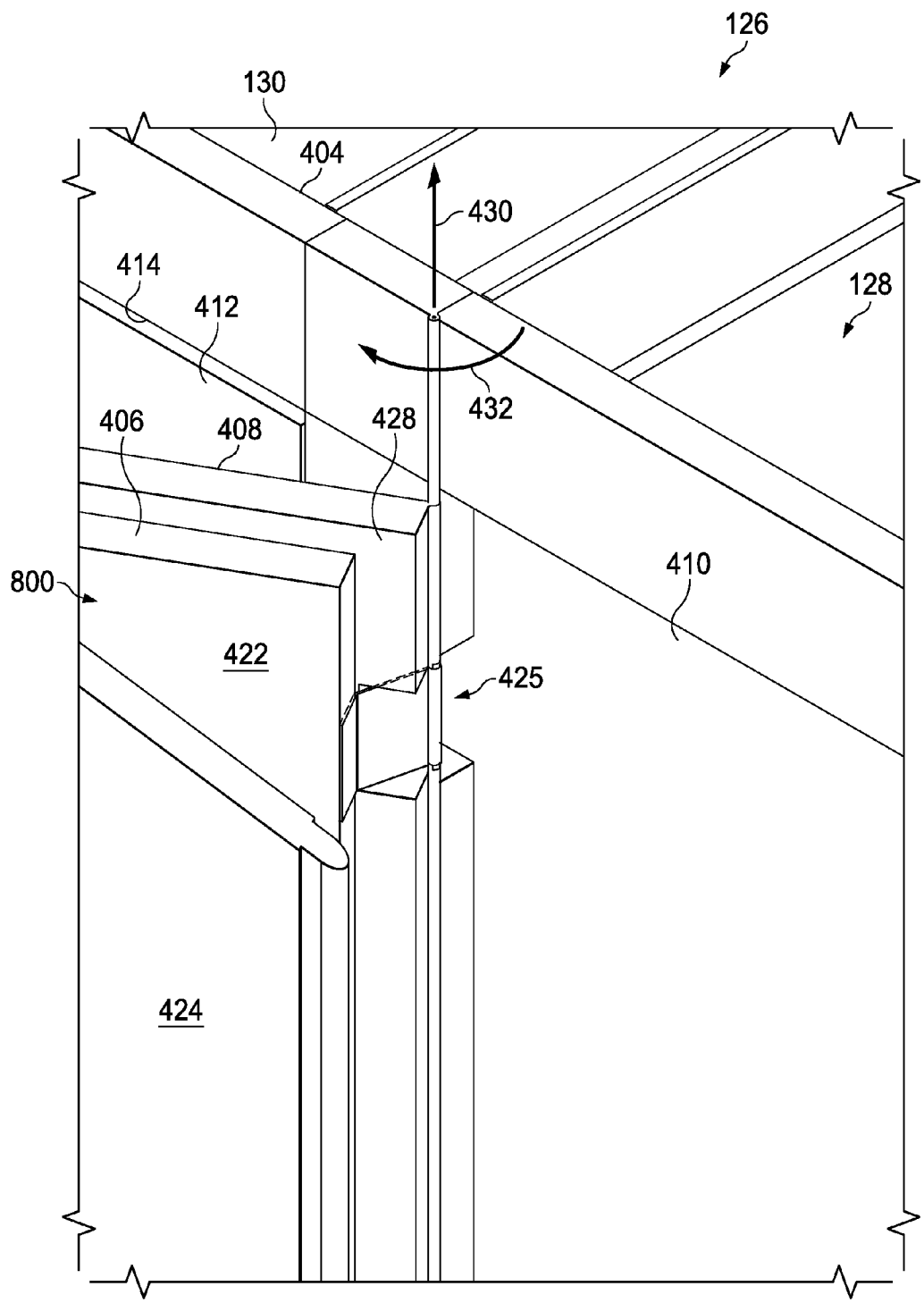
FIG. 13 is another illustration of movement for a hinge connection for a moveable partition in accordance with an illustrative embodiment.

Turning now to FIG. 13, another illustration of movement for a hinge connection for a moveable partition is depicted in accordance with an illustrative embodiment. In this illustration, first door 408 has been opened to allow entry through first opening 410. As can be seen, moveable partition 406 is in folded position 800 against side 428 of first door 408. In this illustrative example, first door 408 and moveable partition 406 have rotated about common axis 430 in the direction of arrow 432.

The illustration of hinge system 425 illustrated in FIGS. 11-13 are only examples of one implementation of hinge system 244 shown in block form in FIG. 2. Of course, other types of hinges and other numbers of hinges may be used other than those shown in these figures.

Figure 14:
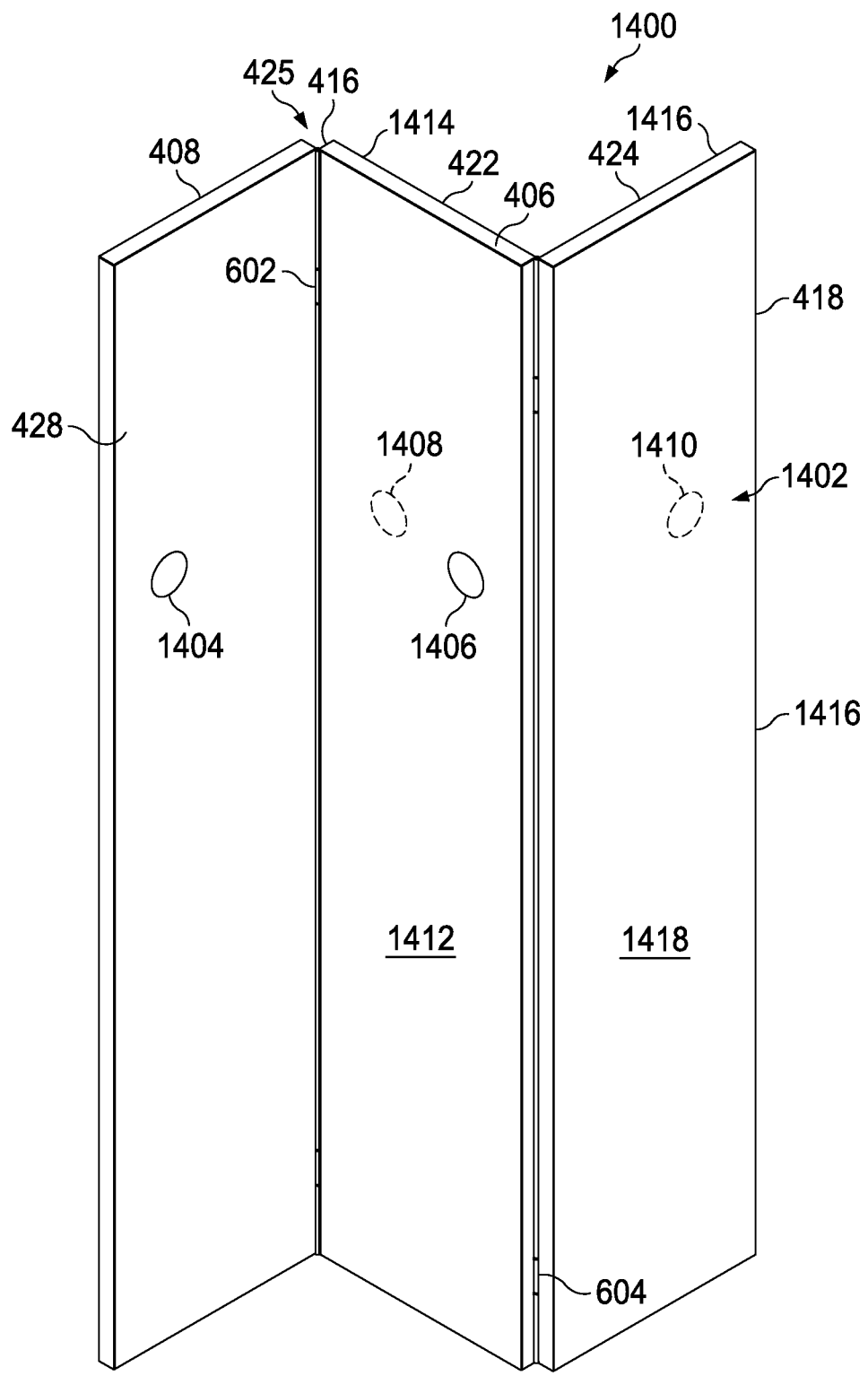
FIG. 14 is an illustration of a connector system for a moveable partition in accordance with an illustrative embodiment.

Turning now to FIG. 14, an illustration of a connector system for a moveable partition is depicted in accordance with an illustrative embodiment. In this illustrative example, connector system 1400 is an example of one implementation for connector system 246 shown in block form in FIG. 2. Connector system 1400 may be a magnetic connector system in these illustrative examples.

In this figure, only first door 408, moveable partition 406, and hinge system 425 are shown. The other components in lavatory area 126 in FIG. 1 are not shown in this figure for purposes of explaining connector system 1400.

In this example, connector system 1400 is comprised of magnetic connectors 1402. In this illustrative example, magnetic connectors 1402 comprise magnetic connector 1404, 1406, 1408, and 1410.

Magnetic connector 1404 is located on side 428 of first door 408. Magnetic connector 1406 is located on first side 1412 of first section 422 of moveable partition 406. Magnetic connector 1408 is shown in phantom. Magnetic connector 1408 is located on second side 1414 of first section 422 of moveable partition 406. Magnetic connector 1410 is shown in phantom and is located on second side 1416 opposite of first side 1418 of second section 424 of moveable partition 406.

When first section 422 and second section 424 are folded against each other, magnetic connector 1408 on second side 1414 of first section 422 and magnetic connector 1410 on second side 1416 of second section 424 are configured to contact each other. Magnetic connector 1408 and magnetic connector 1410 are configured to hold these two sections against each other when these two magnetic connectors contact each other.

When first section 422 is rotated against side 428 of first door 408, magnetic connector 1404 on side 428 of first door 408 is configured to contact magnetic connector 1406 of first side 1412 of first section 422 in moveable partition 406. Magnetic connector 1404 and magnetic connector 1406 connect to each other to hold moveable partition 406 against side 428 of first door 408. As depicted, magnetic connector 1404 and magnetic connector 1406 in connector system 1400 are configured to hold moveable partition 406 in folded position 800 against first door 408 as shown in FIG. 10.

The illustration of connector system 1400 is only presented as one illustrative example of a physical implementation for connector system 246 in FIG. 2. Other implementations may use other configurations of magnetic connectors and other types of connectors in addition to or in place of the magnetic connectors. For example, latches may be used for the connector system in some implementations.

The different components shown in FIG. 1 and FIGS. 3-14 may be combined with components in FIG. 2, used with components in FIG. 2, or a combination of the two. Additionally, some of the components in FIG. 1 and FIGS. 3-14 may be illustrative examples of how components shown in block form in FIG. 2 can be implemented as physical structures.

Figure 15:
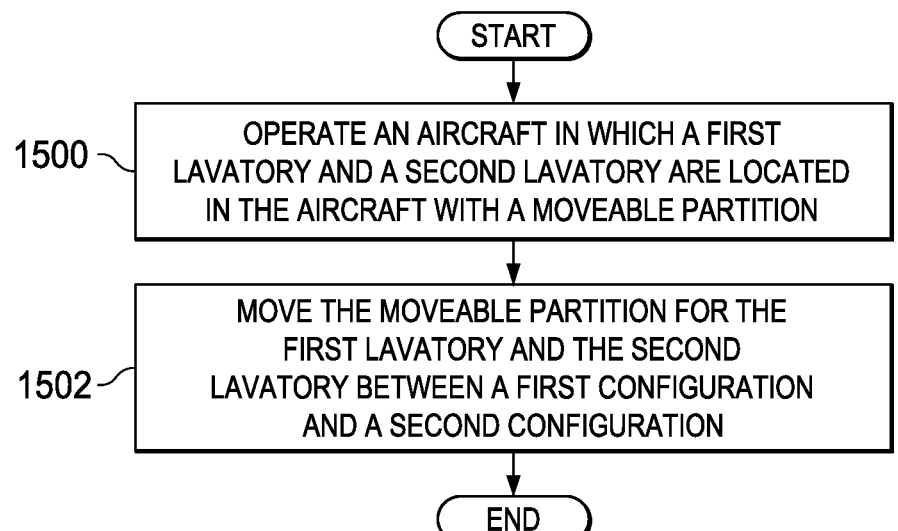
FIG. 15 is an illustration of a flowchart of a process for reconfiguring lavatory space in an aircraft in accordance with an illustrative embodiment.

Turning now to FIG. 15, an illustration of a flowchart of a process for reconfiguring lavatory space in an aircraft is depicted in accordance with an illustrative embodiment. The process in FIG. 15 may be implemented in first lavatory 128 and second lavatory 130 using moveable partition 228 in FIG. 2.

The process begins by operating an aircraft in which a first lavatory and a second lavatory are located in the aircraft with a moveable partition (operation 1500). The moveable partition is for the first lavatory and a second lavatory. The moveable partition moved for the first lavatory and the second lavatory is moved between a first configuration and a second configuration (operation 1502) with the process terminating thereafter. The first configuration of the moveable partition separates the first lavatory and the second lavatory into separate spaces within a fixed perimeter for the first lavatory and the second lavatory. The second configuration for the moveable partition has a single space present within the fixed perimeter and the moveable partition is connected to a door for the first lavatory in the second configuration.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

For example, operation 1502 may be implemented using a hardware system that is configured to change the configuration of a moveable partition based on an input from a human operator if lavatories are unoccupied. For example, a human operator may push one button for the first configuration and a second button for the second configuration. In another illustrative example, the hardware may detect the presence of a wheelchair and automatically change the configuration of the moveable partition if both lavatories are unoccupied.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
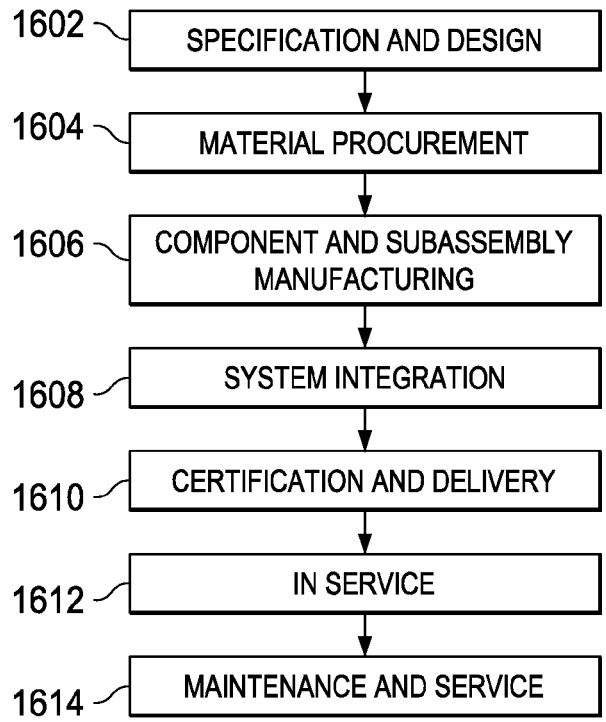
FIG. 16 is an illustration of an aircraft manufacturing and service method in accordance with an illustrative embodiment.
Figure 17:
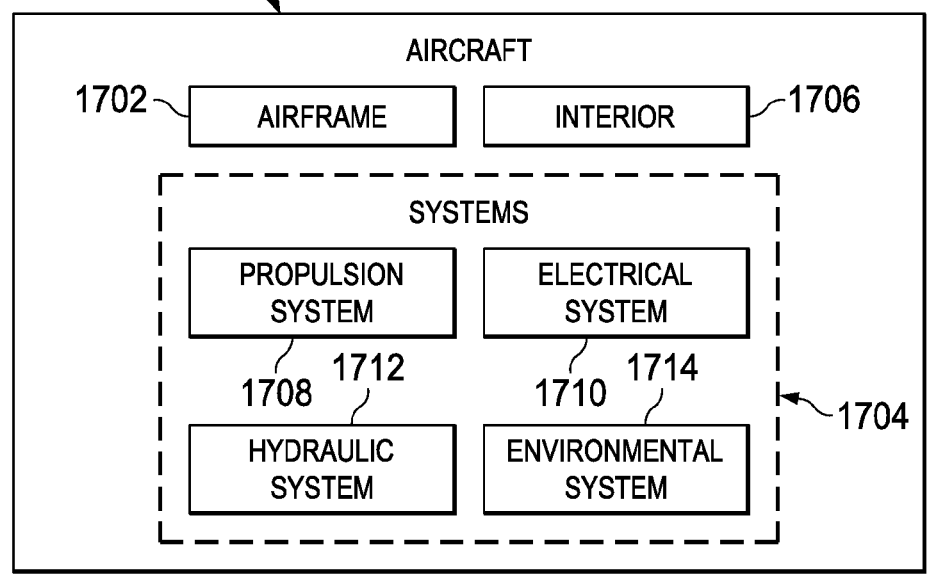
FIG. 17 is an illustration of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Modifications or redesign of lavatory area 126 in FIG. 1 may occur during the process of aircraft manufacturing and service method 1600 in aircraft 1700 in these illustrative examples.

Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. Aircraft 1700 may be one example of aircraft 100 in FIG. 1 or aircraft 202 in FIG. 2.

In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. One or more illustrative embodiments may be designed during specification and design 1602 in stages of aircraft manufacturing and service method 1600. For example, a first lavatory and a second lavatory may be designed with a perimeter that employs a moveable partition. The different components for the first lavatory and the second lavatory with a moveable partition may be manufactured during component and subassembly manufacturing 1606. These components may be installed during system integration 1608.

Further, in some illustrative examples, an illustrative embodiment may be implemented during maintenance and service 1614. For example, a moveable partition may be installed as part of maintenance, upgrade, or refurbishment between a first lavatory and a second lavatory. Further, the aircraft may be configured such that a first lavatory and a second lavatory are adjacent to each other with a common perimeter.

Further, the illustrative embodiments may be used during in service 1612 to reconfigure a first lavatory and a second lavatory to provide a first space and a second space that are divided from each other, or a single space.

In this manner, one or more of the illustrative embodiments may provide increased flexibility and access to lavatories in an aircraft. This increased access may be provided to passengers who may need more space than provided by a standard lavatory. These passengers may be handicapped passengers, larger-sized passengers, or other passengers who may need more room that normally provided by a normal lavatory in aircraft 1700.

Further, the illustrative embodiments allow reconfiguration of a first lavatory and a second lavatory as needed during in service 1612 and, in particular, during the flight of aircraft 1700. Moreover, one or more of the illustrative embodiments provide for additional usable space when the first lavatory and the second lavatory are configured to provide a single space within the perimeter of these lavatories.

The description of the different illustrative embodiments has been presented for purposes of illustration and description, and is not intended to be exhaustive or limited to the embodiments in the form disclosed. Many modifications and variations will be apparent to those of ordinary skill in the art. Although access is described as being provided for handicapped passengers, the reconfiguration of a first lavatory and a second lavatory to provide more space may be performed for other passengers. For example, the reconfiguration using the moveable partition may be performed for families or parents with small children.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a moveable partition configured for use with a first lavatory and a second lavatory, wherein the moveable partition is configured to separate the first lavatory and the second lavatory into separate spaces within a fixed perimeter for the first lavatory and the second lavatory when the moveable partition is in a first configuration and wherein the moveable partition is configured to define a single space within the fixed perimeter when the moveable partition is in a second configuration; and
   a hinge system rotatably connecting the moveable partition to a door of the first lavatory about a common axis, wherein the moveable partition is foldable and configured to be folded against the door in the second configuration.

2. The apparatus of claim 1, wherein the first lavatory includes a first toilet and a first wash basin and the second lavatory includes a second toilet and a second wash basin and wherein the first toilet, the first wash basin, the second toilet, and the second wash basin are unobstructed by the moveable partition in the second configuration.

3. The apparatus of claim 1 further comprising:
   a connector system configured to hold the moveable partition in a folded position against the door.

4. The apparatus of claim 2 further comprising:
   a divider adjacent to at least one of the first toilet and the second toilet, wherein the divider is configured to move.

5. The apparatus of claim 4, wherein the divider is configured to rotate.

6. The apparatus of claim 5, wherein the first lavatory includes the first toilet and the second lavatory includes the second toilet and wherein rotation of the divider towards the wall increases accessibility to at least one of the first toilet and the second toilet.

7. The apparatus of claim 1, wherein the moveable partition is comprised of a composite material.

8. A method for reconfiguring lavatory space in an aircraft, the method comprising:
   moving a moveable partition for a first lavatory and a second lavatory between a first configuration and a second configuration, wherein the first configuration separates the first lavatory and the second lavatory into separate spaces within a fixed perimeter for the first lavatory and the second lavatory, and wherein the second configuration has a single space present within the fixed perimeter and the moveable partition is rotatably connected to a door about a common axis by a hinge system, wherein the moveable partition is foldable and configured to be folded against the door in the second configuration.

9. The method of claim 8, wherein the first lavatory includes a first toilet and a first wash basin and the second lavatory includes a second toilet and a second wash basin and wherein the first toilet, the first wash basin, the second toilet, and the second wash basin are unobstructed by the moveable partition in the second configuration.

10. The method of claim 8 further comprising:
    a connector system configured to hold the moveable partition in a folded position against the door.

11. The method of claim 10, wherein the connector system is a magnetic connector system.

12. The method of claim 8, wherein the first lavatory includes a first toilet and the second lavatory includes a second toilet and wherein a divider is located adjacent to at least one of the first toilet and the second toilet, wherein the divider is configured to rotate towards a wall and rotation of the divider towards the wall increases accessibility to at least one of the first toilet and the second toilet.

13. A method of operating an aircraft, the method comprising:
    operating the aircraft in which a first lavatory and a second lavatory are located in the aircraft with a moveable partition configured for use with the first lavatory and the second lavatory, wherein the moveable partition is configured to separate the first lavatory and the second lavatory into separate spaces within a fixed perimeter for the first lavatory and the second lavatory when the moveable partition is in a first configuration and wherein the moveable partition is configured to define a single space within the fixed perimeter when the moveable partition is in a second configuration, wherein the moveable partition is rotatably connected to a door about a common axis by a hinge system, wherein the moveable partition is foldable and configured to be folded against the door in the second configuration.

14. The method of claim 13, wherein the first lavatory includes a first toilet and a first wash basin and the second lavatory includes a second toilet and a second wash basin and wherein the first toilet, the first wash basin, the second toilet, and the second wash basin are unobstructed by the moveable partition in the second configuration.

15. The apparatus of claim 4, wherein the divider is adjacent to the first toilet and the second toilet.

\* \* \* \* \*